(12) United States Patent
Schmitt et al.

(10) Patent No.: US 11,495,859 B2
(45) Date of Patent: Nov. 8, 2022

(54) BATTERY HAVING A TEMPERATURE CONTROL STRUCTURE AND USE OF SUCH A BATTERY

(71) Applicant: Robert Bosch GmbH, Stuttgart (DE)

(72) Inventors: Markus Schmitt, Tamm (DE); Benjamin Kopp, Remseck am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 17/023,856

(22) Filed: Sep. 17, 2020

(65) Prior Publication Data
US 2021/0083247 A1 Mar. 18, 2021

(30) Foreign Application Priority Data

Sep. 18, 2019 (DE) .......................... 102019214199.4

(51) Int. Cl.
| | |
|---|---|
| *H01M 50/20* | (2021.01) |
| *H01M 10/63* | (2014.01) |
| *H01M 10/647* | (2014.01) |
| *H01M 10/653* | (2014.01) |
| *H01M 10/6567* | (2014.01) |
| *H01M 10/42* | (2006.01) |

(52) U.S. Cl.
CPC ......... *H01M 50/20* (2021.01); *H01M 10/425* (2013.01); *H01M 10/63* (2015.04); *H01M 10/647* (2015.04); *H01M 10/653* (2015.04); *H01M 10/6567* (2015.04)

(58) Field of Classification Search
CPC .... H01M 50/20; H01M 10/63; H01M 10/647; H01M 10/653; H01M 10/6567; H01M 10/425
See application file for complete search history.

(56) References Cited

U.S. PATENT DOCUMENTS

2009/0111007 A1\* 4/2009 Naganuma ............ H01M 50/35
429/82
2014/0220391 A1\* 8/2014 Fujii ................. H01M 10/6554
429/7
(Continued)

FOREIGN PATENT DOCUMENTS

| DE | 102012012663 A1 | 12/2013 |
|---|---|---|
| DE | 102014007638 A1 | 11/2015 |

(Continued)

*Primary Examiner* — Jimmy Vo
(74) *Attorney, Agent, or Firm* — Michael Best & Friedrich LLP

(57) ABSTRACT

A battery comprising a first housing element (2) and a second housing element (3) that jointly form an inner chamber (5) for receiving a battery module (10), wherein the second housing element (3) forms a second temperature control structure (102) on a face that is facing the inner chamber (5) and in particular is facing the first housing element (2), and a cover element (100) is connected to the second housing element (3) in such a manner that a temperature-controlling fluid receiving device (112) through which temperature-controlling fluid can flow is delimited by the cover element (100) in a fluid-tight manner with respect to the inner chamber (5) and the second temperature control structure (102) is embodied in such a manner that the temperature-controlling fluid can flow around it.

20 Claims, 5 Drawing Sheets

(56) References Cited

U.S. PATENT DOCUMENTS

| | | |
|---|---|---|
| 2015/0037649 A1 | 2/2015 | Wyatt et al. |
| 2015/0037662 A1* | 2/2015 | Pinon .................... H01M 50/10 |
| | | 429/179 |
| 2015/0140388 A1* | 5/2015 | Harada ............... H01M 10/617 |
| | | 429/120 |
| 2017/0040653 A1* | 2/2017 | Morris .............. H01M 10/6553 |
| 2017/0179551 A1* | 6/2017 | Shepard ................. H01G 11/82 |

FOREIGN PATENT DOCUMENTS

| | | |
|---|---|---|
| EP | 2330659 A2 | 6/2011 |
| EP | 2908377 A1 | 8/2015 |
| EP | 3331055 A1 | 6/2018 |

\* cited by examiner

BATTERY HAVING A TEMPERATURE CONTROL STRUCTURE AND USE OF SUCH A BATTERY

BACKGROUND OF THE INVENTION

The invention is based on a battery comprising a first housing element and a second housing element that jointly form an inner chamber for receiving a battery module, wherein a plurality of battery cells of the battery module that are interconnected to one another in series and/or parallel in an electrically conductive manner is arranged in the inner chamber, wherein the battery cells are embodied in particular in a prismatic manner and furthermore a first element of a battery control system is arranged in the inner chamber, wherein the first housing element forms a first temperature control structure on a face that is remote from the inner chamber and in particular is remote from the second housing element. Subject matter of the present invention is also the use of such a battery.

It is known from the prior art that a battery module comprises a plurality of individual battery cells that each comprise a positive voltage tap and a negative voltage tap, wherein, in order to connect the plurality of battery cells to one another in series and/or parallel in an electrically conductive manner, the respective voltage taps are connected to one another in an electrically conductive manner and consequently can be interconnected to the battery module. Battery modules for their part are interconnected to batteries or to battery systems. Owing to the fact that there exists a multiplicity of possible different vehicle installation spaces, variable module sizes are desired in order to be able to use the available installation space in an optimal manner.

Furthermore, the battery cells of a battery module, such as for example lithium ion battery cells or lithium polymer battery cells, heat up during operation as a result of chemical conversion processes due to their electrical resistance during power output or power input. These processes are comparatively influenced in particular in the case of a comparatively rapid energy output or energy input. The greater the capacity of a battery or a battery module, the more said battery cells heat up and thus the greater are the requirements for an efficient temperature control system. In order to increase the safety of a battery module and also to ensure the capacity of the battery cells, the battery cells of a battery module are to be both heated up and also cooled down in order for them to be able to operate in the best possible manner in a determined temperature range with the result that for example it is possible to prevent an increased ageing behavior or a breakdown of the cell chemistry.

For example, it is possible to control the temperature of the battery, i.e. heating up or cooling down, by means of a fluid temperature control method using a water/glycol mixture. In this case, this mixture is directed through cooling plates that are arranged below the battery module. In this case, the cooling plate can be connected to a corresponding component of a cooling circuit.

SUMMARY OF THE INVENTION

A battery according to the invention provides the advantage that it is possible to adjust a temperature control process of individual components of the battery to suit their respective requirements. It is possible, in particular by configuring two temperature-controlling fluid receiving devices as temperature control chambers, to meet and optimize separately from one another the requirements regarding the temperature control of a plurality of battery cells and of components of the electronic power system. Consequently, the process of controlling the temperature or reducing the temperature of the plurality of battery cells can be optimized separately from optimizing the process of controlling the temperature or reducing the temperature of the components of the electronic power system.

In accordance with the invention, a battery is provided for this purpose. The battery comprises a first housing element and a second housing element. The first housing element and the second housing element jointly form an inner chamber for receiving a battery module. In this case, a plurality of battery cells of the battery module is arranged in the inner chamber. The plurality of battery cells are interconnected to one another in series and/or parallel in an electrically conductive manner. In particular, the battery cells are embodied in this case in a prismatic manner. It is preferred that the plurality of battery cells is embodied as lithium ion battery cells.

Furthermore, a first element of a battery control system is arranged in the inner chamber.

The first housing element forms a first temperature control structure on a face that is remote from the inner chamber. In particular, the first temperature control structure is furthermore formed on a face that is remote from the second housing element.

The second housing element forms a second temperature control structure on a face that is facing the inner chamber. In particular, the second temperature control structure is furthermore formed on a face that faces the first housing element.

In this case, a cover element is connected to the second housing element in such a manner that the cover element delimits a temperature-controlling fluid receiving device in a fluid-tight manner with respect to the inner chamber, it being possible for a temperature-controlling fluid to flow through said temperature-controlling fluid receiving device. In this case, the second temperature control structure is embodied in such a manner that the temperature-controlling fluid can flow around it.

In particular, one inventive embodiment of the battery provides the advantage that it is possible to efficiently reduce the temperature of the individual components, such as for example the temperature of the plurality of battery cells and of the components of the electronic power system, since comparatively short thermal paths are produced. At the same time, it is possible to realize a compact design of the battery.

It is of advantage if the first element of the battery control system is arranged in a thermally conductive manner on a face of the cover element that is facing the inner chamber. As a consequence, it is possible to control the temperature of the first element of the battery control system in a reliable manner. In particular, it is possible in this case to control the temperature of the first element of the battery control system irrespective of the number of battery cells. In this case, it is possible by means of designing the second temperature control structure to influence the process of controlling the temperature of the first element of the battery control system.

It is furthermore expedient if a second element of the battery control system is arranged in a thermally conductive manner on a face of the second housing element that is remote from the inner chamber and in particular is remote from the first housing element. As a consequence, it is likewise possible to control the temperature of the second element of the battery control system in a reliable manner.

In particular, it is possible to control the temperature of the second element of the battery control system irrespective of the number of battery cells.

It is of advantage if the first element of the battery system comprises at least one electrical component of the battery module and/or at least one electronic component of the battery module.

It is of advantage in this case if the electrical component of the battery module is a cell connector and/or a conductor. In this case, cell connectors are configured so as to connect voltage taps of the plurality of battery cells to one another in series and/or parallel in an electrically conductive manner. Conductors are configured so as to conduct electrical current from one component to another component. It is preferred if the electronic component of the battery module is a switch, a safety element, a battery control system and/or a resistance. By virtue of arranging the electrical component and/or the electronic component within the inner chamber of the battery, it is possible to interconnect the plurality of battery cells of the battery module to one another in series and/or parallel in an electrically conductive manner and to control and regulate the battery module. Furthermore, at the same time, it is possible to control the temperature of these components in a reliable manner.

In accordance with a preferred aspect of the invention, the at least one electronic component is integrated in this case into a printed circuit board. Furthermore, the conductor can also be integrated at least in part into the printed circuit board. This provides the advantage of a comparatively compact design which furthermore likewise renders it possible to control the temperature in a simple manner.

It is moreover expedient if the second element of the battery control system is an electrical voltage converter, in particular a DC converter. Furthermore, the electrical voltage converter or the DC converter can be arranged on a further printed circuit board or in a further printed circuit board.

In this case, it is furthermore possible to arrange a thermal compensating material, such as for example a thermally conductive adhesive, a so-called gap filler or a so-called thermal interface material (TIM), between the electrical voltage converter or the DC converter and the second housing element. It is possible to realize a reliable, thermal conductor by virtue of connecting the electrical voltage converter to the second housing element, such as for example using screws. Overall, this produces a comparatively short thermal path between a temperature-controlling fluid that is flowing through the temperature-controlling fluid receiving device of the second housing element and the electrical voltage converter or the DC converter having a consequently comparatively low thermal resistance.

It is particularly preferred if the cover element is embodied in a planar manner and from a metal material or if the cover element has a molded shape for receiving the first element of the battery control system. In particular, it is possible in this case to embody the cover element from a metal sheet.

The cover element can be connected to the second housing element in this case for example in a material-bonded manner, such as in particular welded. For this purpose, the second housing element can comprise for example a connecting region that is configured so as to be connected to the cover element in a material-bonded manner. It is to be noted again at this point that the cover element seals the temperature-controlling fluid receiving device in a fluid-tight manner with respect to the inner chamber. In particular, it is possible to realize such a sealing arrangement by virtue of connecting the cover element to the connecting region of the second housing element in a material-bonded manner.

Furthermore, it is also possible for the cover element to be connected to the second housing element for example in a positive-locking manner, such as in particular by means of screws. In this case, in order to realize a reliable sealing arrangement, it is possible furthermore to arrange an additional sealing element between the cover element and the second housing element.

A planar design of the cover element provides the advantage that a comparatively as large as possible thermal contact surface area is realized for connecting the first element of the battery control system.

A cover element having a molded shape for receiving the first element of the battery control system provides for example the advantage that it is possible to adjust accordingly a height of the temperature-controlling fluid receiving device through which temperature-controlling fluid can flow, as a result of which it is possible to realize a design which is optimized in particular with regard to the installation space. Furthermore, it is possible by means of this molded shape to realize a reliable receiving device of the first element of the battery control system. It is also to be further noted at this point that it is possible by way of example by virtue of designing a bend angle to realize a height of the temperature-controlling fluid that decreases in the flow direction or in the longitudinal direction of the temperature-controlling fluid receiving device.

Furthermore, it is to be noted that the cover element is embodied from a metal material, the metal material can be selected in this case from aluminum, copper or nickel. This provides the advantage of a comparatively high thermal conductivity.

In particular, it is possible in this case to arrange a thermal compensating element, such as for example a thermally conductive adhesive, between the first element of the battery control system and the cover element.

In an expedient manner, the plurality of battery cells is arranged in a thermally conductive manner with an inner face of the inner chamber that is arranged directly adjacent to the first temperature control structure. As a consequence, it is possible to control the temperature of the plurality of battery cells as a whole in a very reliable manner. In addition, it is possible as a consequence, to control the temperature of the plurality of battery cells for example independently from the first element of the battery control system and also independently from the second element of the battery control system. In particular, it is possible in this case to arrange a thermal compensating element, such as for example a thermally conductive adhesive, between the plurality of battery cells and the inner face.

It is expedient if the first housing element and/or the second housing element are each embodied as a die-cast housing. As a consequence, it is possible to realize a mechanically comparatively stable configuration. In addition, it is possible as a consequence to be able to embody within the die-cast components regions that convey temperature-controlling fluid with the result that it is possible to forego additional cooling plates, heating elements or temperature control systems.

It is of advantage if the first housing element and the second housing element are embodied in a fluid-tight manner connected to one another. In particular, a sealing element is arranged for this purpose between the first housing element and the second housing element. Consequently, it is possible to realize a fluid-tight sealed inner chamber of the battery. In particular, it is possible hereby to protect the battery cells, the electrical component and/or the electronic components against external influences.

In accordance with a preferred aspect of the invention, the plurality of battery cells is embodied as prismatic battery cells. Prismatic battery cells have in this case a total of six side surfaces that are arranged in pairs lying opposite one another and parallel with one another. Furthermore, side surfaces that are arranged adjacent to one another are arranged at an angle with respect to one another. Overall, it is possible by virtue of using prismatic battery cells in a battery in accordance with the invention to realize a compact battery.

It is expedient if a further cover element is arranged on the first housing element. In particular, the further cover element is arranged connected to the first housing element. In this case, the further cover element and the first temperature control structure jointly form a further temperature-controlling fluid receiving device that is embodied to allow the through-flow of temperature-controlling fluid. In this case, the further cover element delimits the further temperature-controlling fluid receiving device in a fluid-tight manner with respect to an environment. In addition, the first temperature control structure is embodied in such a manner that the temperature-controlling fluid can flow around it. This provides the advantage that the first temperature control structure can be adjusted to suit the requirements with respect to controlling the temperature of the plurality of battery cells that are received in the inner chamber. This adjustment can be performed in this case independently for example from the process of cooling the electrical component and/or the electronic component and also independently from the process of cooling the electrical voltage converter or the DC converter. For example, the first temperature control structure can comprise flow-disturbing elements or flow-conducting elements that are only arranged at sites where owing to the required temperatures of the plurality of battery cells they can have a positive influence on the temperature control process. Furthermore, the remaining regions of the further temperature-controlling fluid receiving device can be optimized with respect to flow and the pressure loss. In particular, it is possible to forego a compromise between controlling the temperature of the plurality of battery cells and the electrical component and/or the electronic component and also the electrical voltage converter since it is possible to control the temperature of these components independently on one another.

It is preferred that the further cover element is connected to the first housing element in a material-bonded manner. In particular, the further cover element can be welded or soldered to the first housing element. Furthermore, a second sealing element can be arranged between the first housing element and the cover element.

It is also preferably possible if the further cover element is embodied by means of the first housing element.

In particular, this provides the advantage that by virtue of such a design it is possible to prevent temperature-controlling fluid from passing into the inner chamber to the plurality of battery cells in the event of malfunctions or leakage sites of the first temperature control chamber.

In an advantageous manner, the battery comprises a first connection and a second connection. The first connection is embodied in this case so as to convey the temperature-controlling fluid to the battery and the second connection is embodied in this case so as to convey the temperature-controlling fluid away from the battery.

In particular, the first connection and the second connection form an interface to a motor vehicle.

In accordance with a first aspect, the temperature-controlling fluid can flow through the temperature-controlling fluid receiving device and the further temperature-controlling fluid receiving device in series. In this case, the temperature-controlling fluid flows for example initially through the temperature-controlling fluid receiving device and subsequently through the further temperature-controlling fluid receiving device or conversely initially through the further temperature-controlling fluid receiving device and subsequently through the temperature-controlling fluid receiving device.

In accordance with a second aspect of the invention, the temperature-controlling fluid can flow through the temperature-controlling fluid receiving device and the further temperature-controlling fluid receiving device in a parallel manner. In this case, after the temperature-controlling fluid has flowed through the first connection, said temperature-controlling fluid is divided into a first part flow, which flows through the temperature-controlling fluid receiving device, and into a second part stream, which flows through the further temperature-controlling fluid receiving device. The first part flow and the second part flow are brought back together again after flowing through the respective temperature-controlling fluid receiving device and conveyed out of the battery by means of the second connection.

As a consequence, it is possible overall for example to minimize the pressure loss. Furthermore, it is possible hereby for example to also improve the thermal transfer.

In particular, in this case the first housing element and/or the second housing element each comprise a temperature-controlling fluid inlet and a temperature-controlling fluid outlet. The respective temperature-controlling fluid is used so as to allow the temperature-controlling fluid to pass into the temperature-controlling fluid receiving device or the further temperature-controlling fluid receiving device, and the respective temperature-controlling fluid outlet is used so as to allow temperature-controlling fluid to flow out of the temperature-controlling fluid receiving device or out of the further temperature-controlling fluid receiving device. Furthermore, a temperature-controlling fluid outlet and a temperature-controlling fluid inlet can also be connected to one another in a fluid-conducting manner with the result that temperature-controlling fluid can flow between the temperature-controlling fluid receiving device and the further temperature-controlling fluid receiving device or conversely.

For example, the temperature-controlling fluid inlet of the first housing element can form the first connection of the battery with the result that temperature-controlling fluid can flow in thereby. Furthermore, it is possible for example for the temperature-controlling fluid outlet of the first housing element to be connected in a fluid-conducting manner to the temperature-controlling fluid inlet of the second housing element with the result that temperature-controlling fluid can flow first through the further temperature-controlling fluid receiving device and subsequently through the temperature-controlling fluid receiving device, i.e. a series through-flow is produced. In addition, it is possible for the temperature-controlling fluid outlet of the second housing element to form the second connection of the battery with the result that thereby temperature-controlling fluid can flow out of the temperature-controlling fluid receiving device.

For example, the temperature-controlling fluid inlet of the second housing element can form the first connection of the battery with the result that temperature-controlling fluid can flow in thereby into the temperature-controlling fluid receiving device. Furthermore, it is possible for example for the temperature-controlling fluid outlet of the second housing element to be connected to the temperature-controlling fluid inlet of the first housing element in a fluid-conducting manner with the result that temperature-controlling fluid can flow first through the temperature-controlling fluid receiving device and subsequently through the further temperature-controlling fluid receiving device, i.e. a series through-flow is produced.

It is to be noted that such a connection between the temperature-controlling fluid inlet of the one housing element and the temperature-controlling fluid outlet of the other housing element is embodied preferably within the first housing element and/or within the second housing element, which are furthermore embodied in particular preferably in each case as a die-cast housing.

It is expedient if the first temperature control structure and/or the second temperature control structure are each embodied as flow-conducting elements, as flow-disturbing elements or as flow-delimiting elements.

In particular, the first temperature control structure and/or the second temperature control structure can each be embodied by means of the corresponding die-cast housing.

At this point, flow-conducting elements are to be understood to be such elements that are arranged within a respective temperature control chamber and are used so as to deflect a flow without creating a comparable increase in the turbulence.

At this point, flow-disturbing elements are to be understood to be such elements that are arranged within a respective temperature control chamber and are used so as to increase the turbulence of a flow, in particular to bring about a change from a laminar flow to a turbulent flow in order in each case to produce an improved thermal discharge.

At this point, flow-delimiting elements are to be understood to be such elements that mechanically delimit the respective temperature control chamber.

It is also of advantage if the electrical component and/or the electronic component are connected in a thermally conductive manner to a face of the cover element that is facing the inner chamber. In particular, it is possible in this case to arrange a thermal compensating element, such as for example a thermally conductive adhesive or a so-called thermal interface material (TIM), between the electrical component and/or the electronic component and the cover element.

For example by means of connecting a printed circuit board, which comprises the electronic component, to the cover element, for example also by means screws or by means of a material-bonded connection, it is possible provide a reliable thermal conductor. Overall, this produces a comparatively short thermal path between a temperature-controlling fluid, which is flowing through the temperature-controlling fluid receiving device, and the printed circuit board having a consequently comparatively low thermal resistance.

The subject matter of the present invention is also the use of a battery that has just been described and is in accordance with the invention so as to control the temperature and in particular to reduce the temperature of the plurality of battery cells of the electrical component and/or of the electronic component and/or of the electric voltage converter, wherein a temperature-controlling fluid that is in the form of temperature-controlling liquid or a temperature-controlling gas flows around the first temperature control structure or wherein the temperature-controlling fluid that is in the form of a temperature-controlling liquid flows through the temperature-controlling fluid receiving device.

In particular, the battery is described in this case in such a manner that the temperature of the battery cells, which are preferably embodied as lithium ion battery cells, is below a temperature of 40° C. and preferably below a temperature of 35° C. As a consequence, it is possible to realize an adequate thermal management of the whereby the battery cells can be operated in a thermally non-critical state as a result of which for example it is possible to realize that the battery cells age in a uniform manner since in particular a temperature gradient from battery cell to battery cell is comparatively small.

BRIEF DESCRIPTION OF THE DRAWINGS

Exemplary embodiments of the invention are illustrated in the drawings and further explained in the description below.

In the drawings.

DETAILED DESCRIPTION

Figure 1:
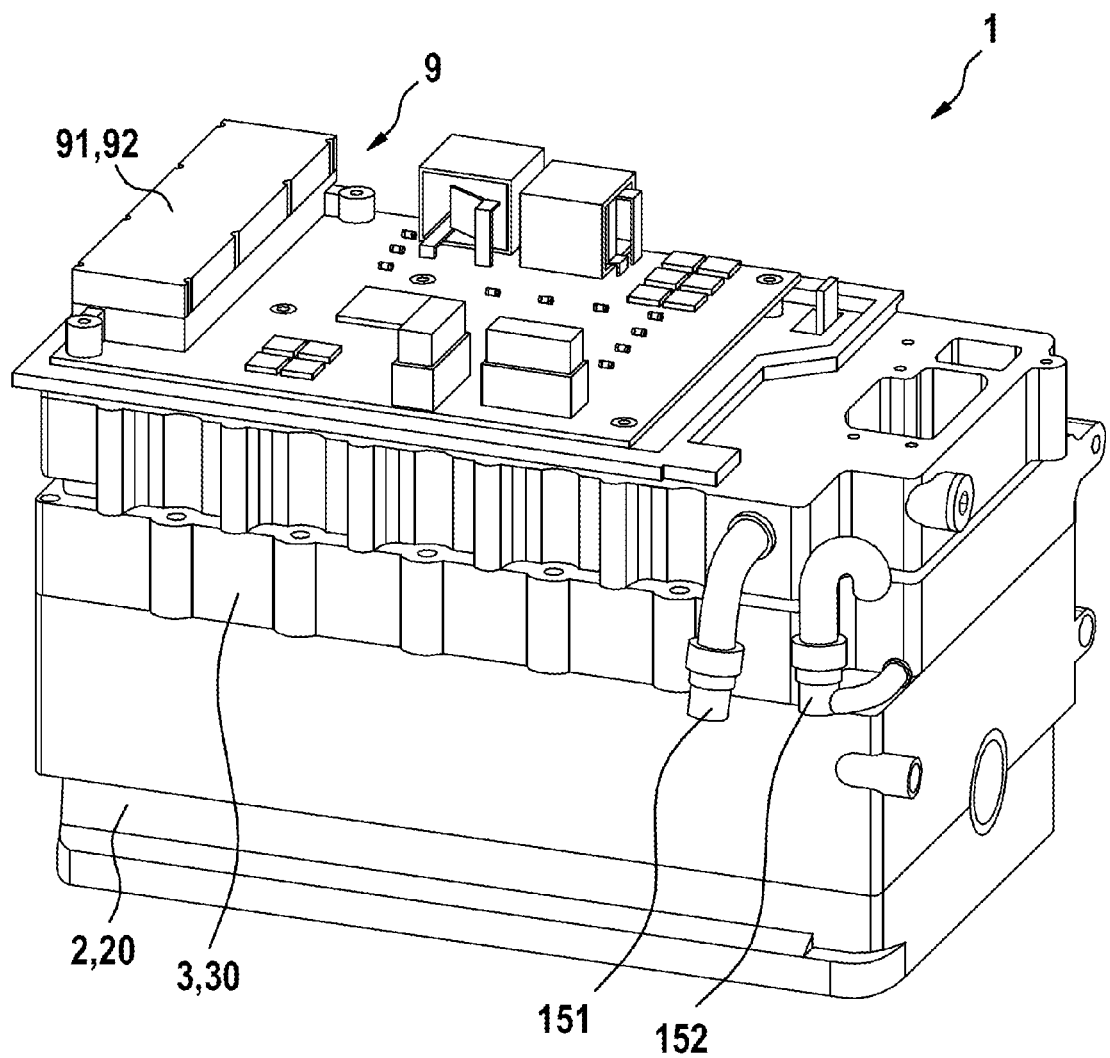
FIG. 1 illustrates a perspective view of one embodiment of a battery in accordance with the invention.
Figure 2:
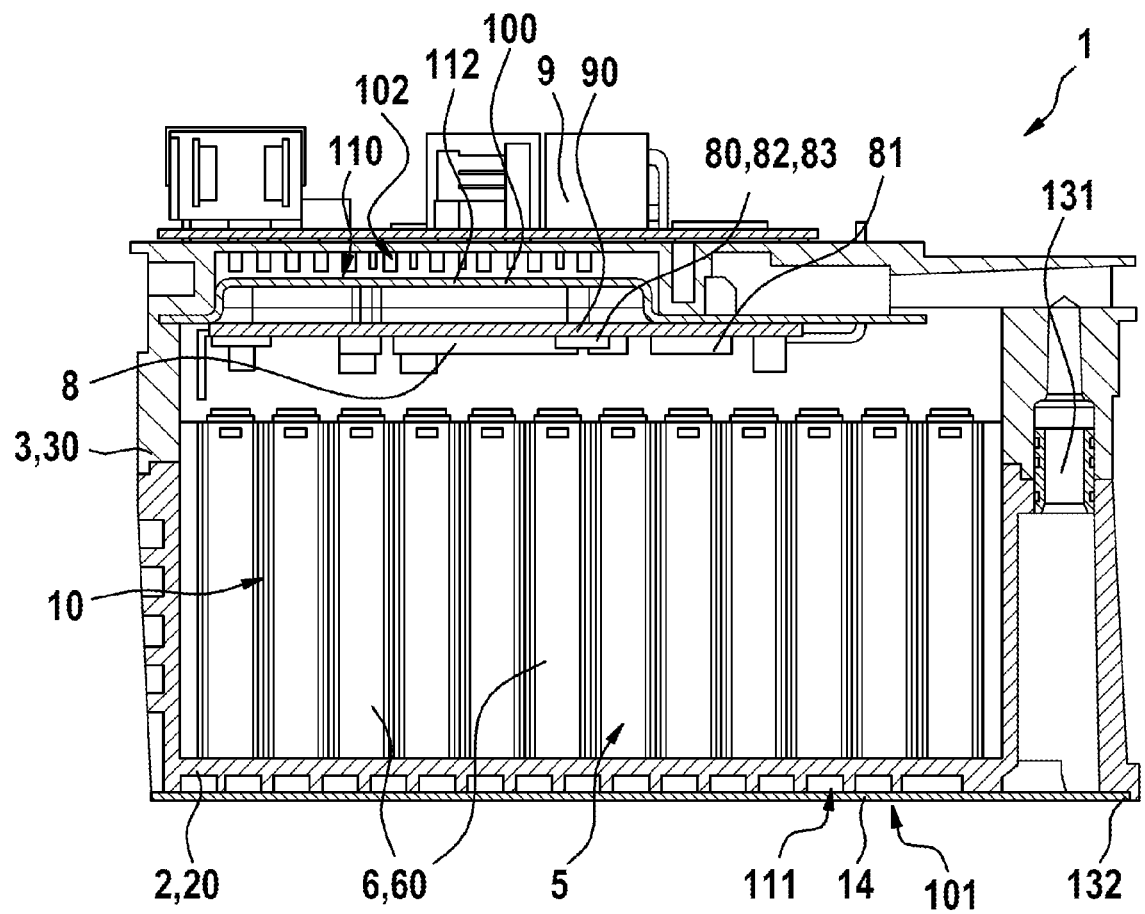
FIG. 2 illustrates a sectional view of the embodiment of a battery in accordance with FIG. 1.

FIG. 1 illustrates a perspective view of one embodiment of a battery 1 in accordance with the invention. FIG. 2 illustrates a sectional view of this embodiment in accordance with the invention of the battery 1 in accordance with FIG. 1. The FIGS. 1 and 2 are now to be described jointly.

The battery 1 comprises a first housing element 2 and a second housing element 3. In accordance with the embodiment of the battery 1 illustrated in FIGS. 1 and 2, the first housing element 2 is embodied as a die-cast housing 20 and the second housing element 3 is embodied as a die-cast housing 30.

The first housing element 2 and the second housing element 3 jointly form an inner chamber 5 for receiving a battery module 10. The inner chamber 5 and the battery module 10 are apparent in particular in the sectional view in accordance with FIG. 2. In particular, the first housing element 2 and the second housing element 3 are embodied in a fluid-tight manner connected to one another. For this purpose, a sealing element 131 is arranged between the first housing element 2 and the second housing element 3. In particular, the first housing element 2 and the second housing 3 can also be connected to one another by means of screws in order to provide a reliable mechanical connection.

A plurality of battery cells 6 is received in the inner chamber 5. The plurality of battery cells 6 of the battery module 10 is in this case interconnected to one another in series and/or parallel in an electrically conductive manner. It is preferred that the plurality of battery cells 6 is embodied in each case as prismatic battery cells 60 as is for example apparent in FIG. 2.

The second housing element 3 forms a second temperature control structure 102 on a face that faces the inner chamber 5. In particular, the second temperature control structure 102 is arranged facing the first housing element 2.

Furthermore, the battery 1 comprises a cover element 100 that is connected to the second housing element 3 in such a manner that a temperature-controlling fluid receiving device 112 through which temperature-controlling fluid can flow is delimited by the cover element 100 in a fluid-tight manner with respect to the inner chamber 5. Furthermore, the second temperature control structure 102 is embodied in such a manner that temperature-controlling fluid can flow around it.

In this case, the cover element 100 comprises in accordance with the embodiments illustrated in FIGS. 1 and 2 a molded shape 110 for receiving a first element 8 of the battery control system.

Furthermore, it is also possible to embody the cover element 100 in a planar manner from metal.

Furthermore, a first element 8 of a battery control system is arranged in the inner chamber 5. The first element 8 of the battery control system is in this case arranged in a thermally conductive manner on a face of the cover element 100 that is facing the inner chamber 5.

The first element 8 of the battery control system can comprise for example an electrical component 80 of the battery module 10 and/or an electronic component 81 of the battery module 10. For example, the electrical components 80 can be cell connectors 82 that interconnect the plurality of battery cells 6, 60 to one another in series and/or parallel in an electrically conductive manner. Furthermore, the electrical components 8 can be conductors 83 that convey electrical current. For example, the electronic components 81 of the battery module 6 can be switches, safety elements, battery control systems and/or resistances. It is particularly preferred that the electronic components 81, such as is apparent from FIG. 2, are integrated at least in part into a printed circuit board.

The first housing element 2 embodies a first temperature control structure 101 on a face that is remote from the inner chamber 5. In particular, in the case of the embodiment in accordance with FIGS. 1 and 2, the first temperature control structure 101 is arranged on a face of the first housing element 2 that is remote from the second housing element 3. Furthermore, FIG. 2 also illustrates that a further cover element 14 is arranged on the first housing element 2. In this case, the cover element 14 and the first housing element 2 jointly form a further temperature-controlling fluid received device 111 through which temperature-controlling fluid can flow. The first temperature control structure 101 is in this case arranged within the further temperature-controlling fluid receiving device 111. In particular, the cover element 14 can be connected in a material-bonded manner to the first housing element 2. In this case, it is further preferred that a sealing element 132 can be arranged between the first housing element 2 and the cover element 14.

In this case, it is apparent from FIG. 2 that the plurality of battery cells 6 is arranged in a thermally conductive manner with a first inner face of the inner chamber 5 that is arranged directly adjacent to the first temperature control structure 101.

Furthermore, FIG. 1 illustrates in particular that the battery 1 comprises a first connection 151 and a second connection 152. The first connection 151 is in this case embodied so as to convey temperature-controlling fluid to the battery 1 and the second connection 152 is embodied in this case so as to convey temperature-controlling fluid out of the battery 1. In this case, the temperature-controlling fluid can flow through the battery 1 and in particular through the temperature-controlling fluid receiving device 111 and the temperature-controlling fluid receiving device 112 in series or parallel.

Furthermore, the battery module comprises a second element 9 of the battery control system. The second element 9 of the battery control system is in this case arranged in a thermally conductive manner on a face of the second housing element 3 that is remote from the inner chamber 5 and in particular is remote from the first housing element 2.

In particular, the second element 9 of the battery control system can be an electrical voltage converter 91, such as in particular a DC converter 92.

Figure 3:
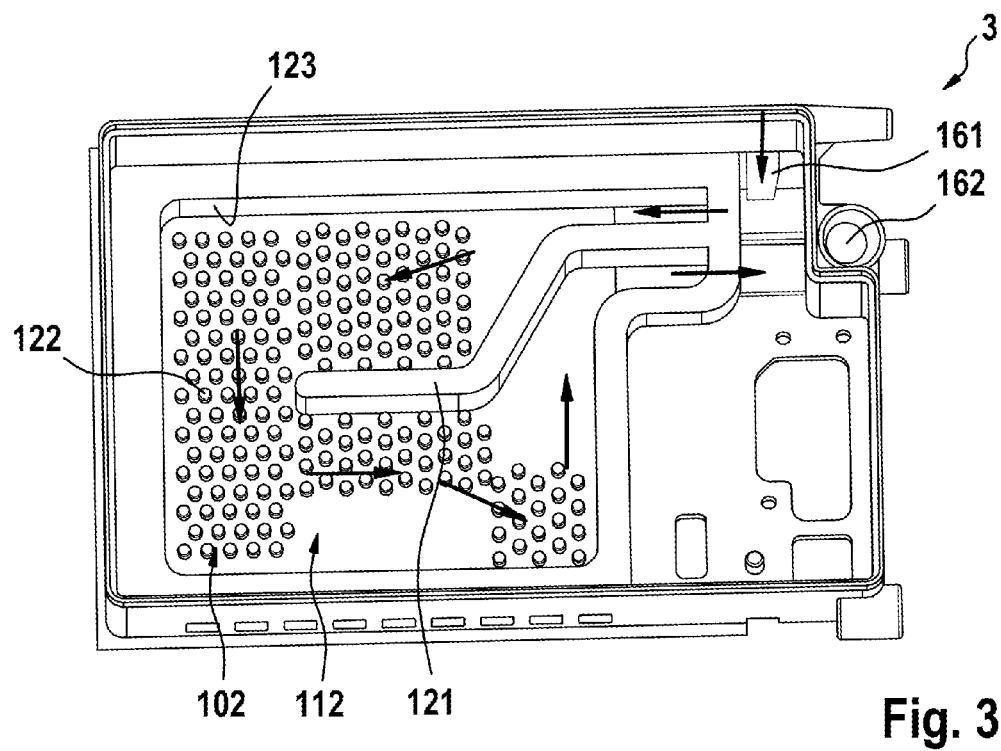
FIG. 3 illustrates a perspective view of a lower face of a second housing element.

FIG. 3 illustrates a perspective view of a lower face of a second housing element 3 in accordance with the invention. In this case, the temperature-controlling fluid inlet 161 of the second housing element 3 is apparent, said temperature-controlling fluid inlet being embodied so as to allow temperature-controlling fluid to pass into the temperature-controlling fluid receiving device 112. Furthermore, the temperature-controlling fluid outlet 162 of the second housing element 3 is apparent in this case. The second temperature-controlling fluid outlet 162 is embodied so as to allow temperature-controlling fluid to flow out of the temperature-controlling fluid receiving device 112.

It is to be noted at this point that the temperature-controlling fluid inlet 161 can also form the first connection 151 of the battery 1 or can be connected to the first connection 151 in a fluid-conducting manner or that the temperature-controlling fluid outlet 162 can also form the second connection 152 of the battery 1 or can be connected to the second connection 152 in a fluid-conducting manner.

Furthermore, FIG. 3 also illustrates that the second housing element 3 comprises the second temperature control structure 102. The second temperature control structure 102 can comprise in this case flow-conducting elements 121 that are embodied so as to delimit the receiving device 112 in such a manner that the temperature-controlling fluid is guided accordingly. Furthermore, the second temperature control structure 102 can comprise in this case flow-disturbing elements 122 that are embodied so as to increase the turbulence of the temperature-controlling fluid that is flowing through the temperature-controlling fluid receiving device 112. Moreover, the second temperature control structure 102 can also comprise flow-delimiting elements 123 that delimit the temperature-controlling fluid receiving device 112 in a fluid-tight manner.

A flow guide within the temperature-controlling fluid receiving device 112 is represented schematically by means of the illustrated arrows. In particular, the flow guide is U-shaped.

It is to be noted at this early point that the cover element 100 is arranged in such a manner that the temperature-controlling fluid receiving device 112 is sealed in a fluid-tight manner with respect to the inner chamber 5. In particular, the cover element 100 can be connected in this case for example in a material-bonded manner to the second housing element 3.

Figure 4:
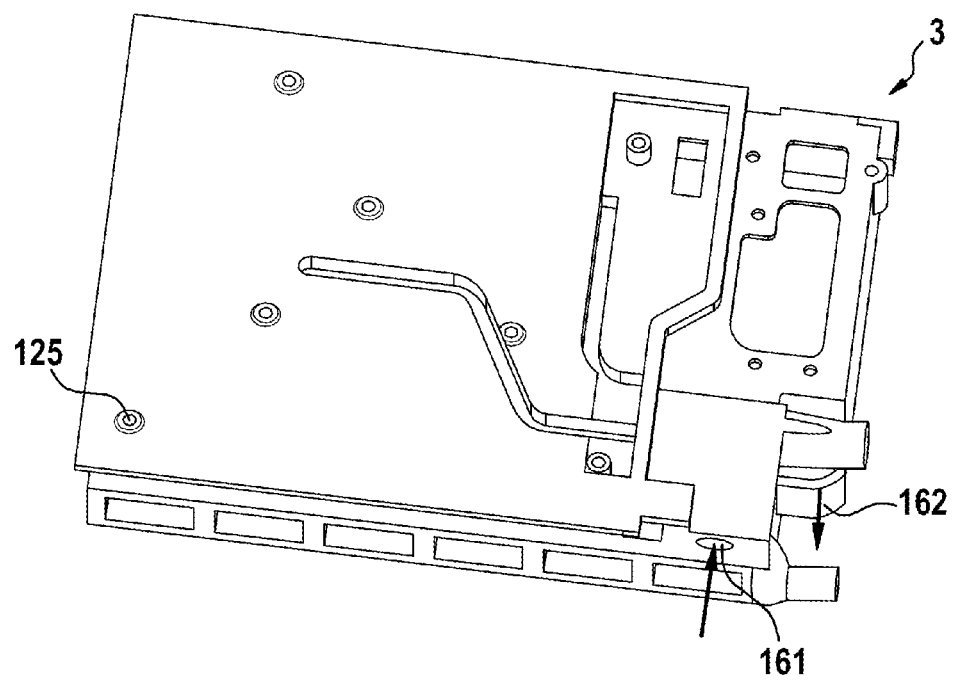
FIG. 4 illustrates a perspective view of an upper face of the second housing element in accordance with FIG. 3.

FIG. 4 illustrates in a perspective view an upper face of the second housing element 3 in accordance with FIG. 3. In particular, the temperature-controlling fluid inlet 161 of the second housing element 3 and the temperature-controlling fluid outlet 162 of the second housing element 3 are also illustrated in this figure.

It is to be particularly noted at this point that the second element 9 of the battery control system, for example the electrical voltage converter 91 or in particular the DC converter 92 can be arranged directly on the illustrated upper face in a thermally conductive manner. For this purpose, the second housing element 3 can comprise for example screw connection points 125.

Figure 5:
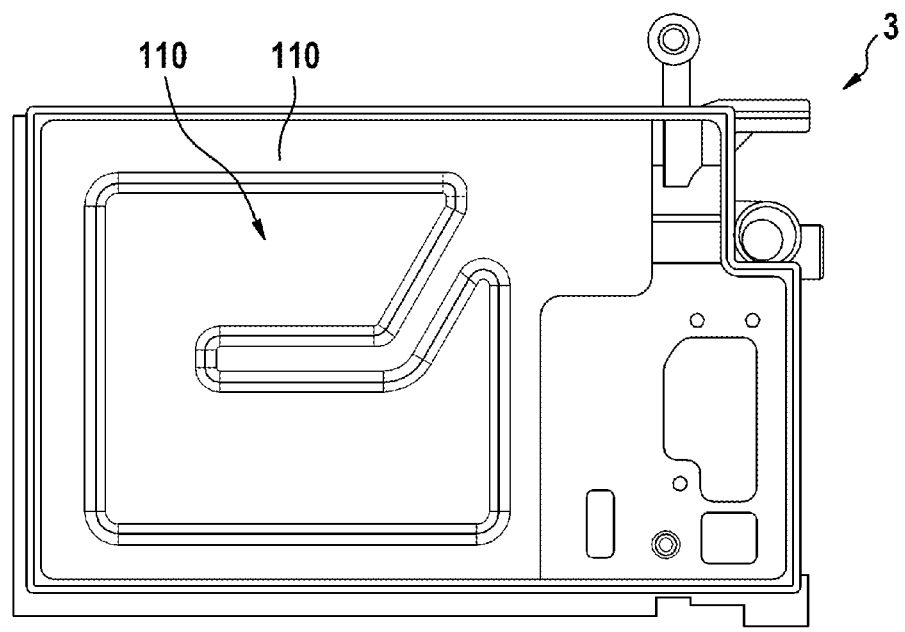
FIG. 5 illustrates a perspective view of a lower face of a second housing element with a cover element.

FIG. 5 illustrates a perspective view of a lower face of a second housing element 3 in accordance with the invention having a cover element 100. In particular, the configuration of the second housing element 3 corresponds to the configuration in accordance with FIG. 3. The cover element 100 is in this case connected to the second housing element 3 in such a manner that the cover element 100 delimits the temperature-controlling fluid receiving device 112 in a fluid-tight manner with respect to the inner chamber 5. In accordance with FIG. 5, the cover element 100 is embodied from a metal material. Furthermore, the cover element 100 comprises a molded shape 110. The molded shape 110 is embodied in this case so as to receive the first element 8 of the battery control system, such as is for example also apparent in FIG. 2.

Figure 6:
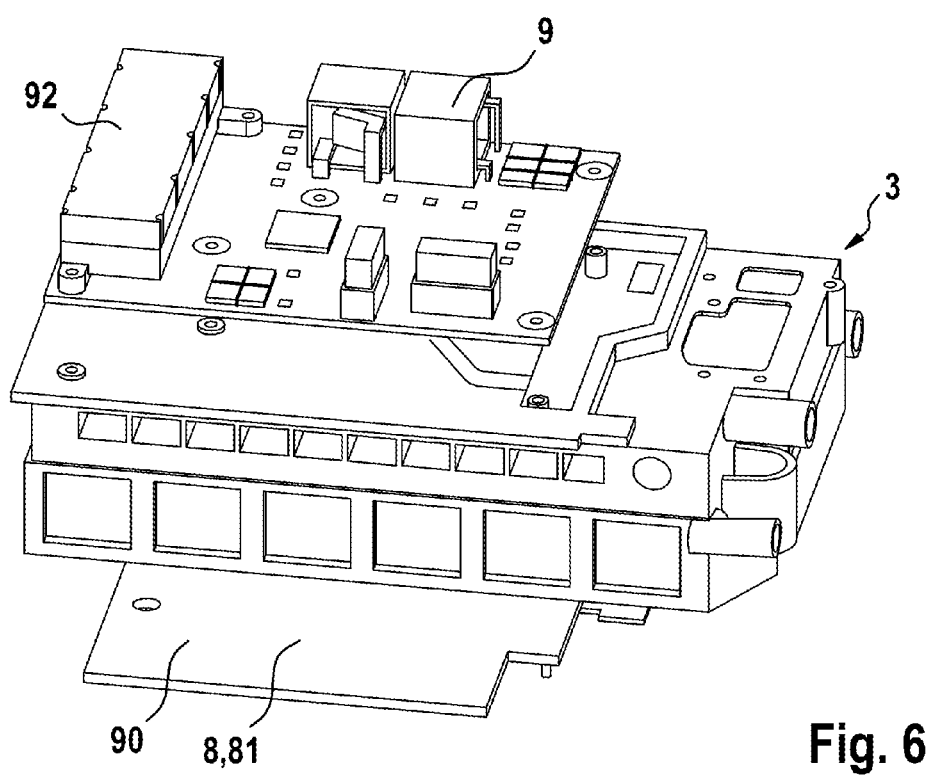
FIG. 6 illustrates an exploded view of a section of a battery in accordance with the invention.

FIG. 6 illustrates an exploded view of a section of a battery 1 in accordance with the invention.

The second housing element 3 is illustrated in this figure. Furthermore, the first element 8 of the battery control system is apparent, said first element comprising an electronic component 81. In this case, the electronic component 81 is integrated into a printed circuit board 90.

Furthermore, it is apparent that the first element 8 of the battery control system is arranged on a face of the cover element 100 that is facing the inner chamber 5.

Moreover, FIG. 6 also illustrates the second element 9 of the battery control system, said second element being arranged in a thermally conductive manner on a face of the second housing element 3 that is remote from the inner chamber 5. In this case, the second element 9 of the battery control system is embodied in particular as a DC converter 92.

In this case, the second element 9 of the battery control system can be connected to the second housing element 3 for example by means of screw connection points 125 that are illustrated in FIG. 4.

Figure 7:
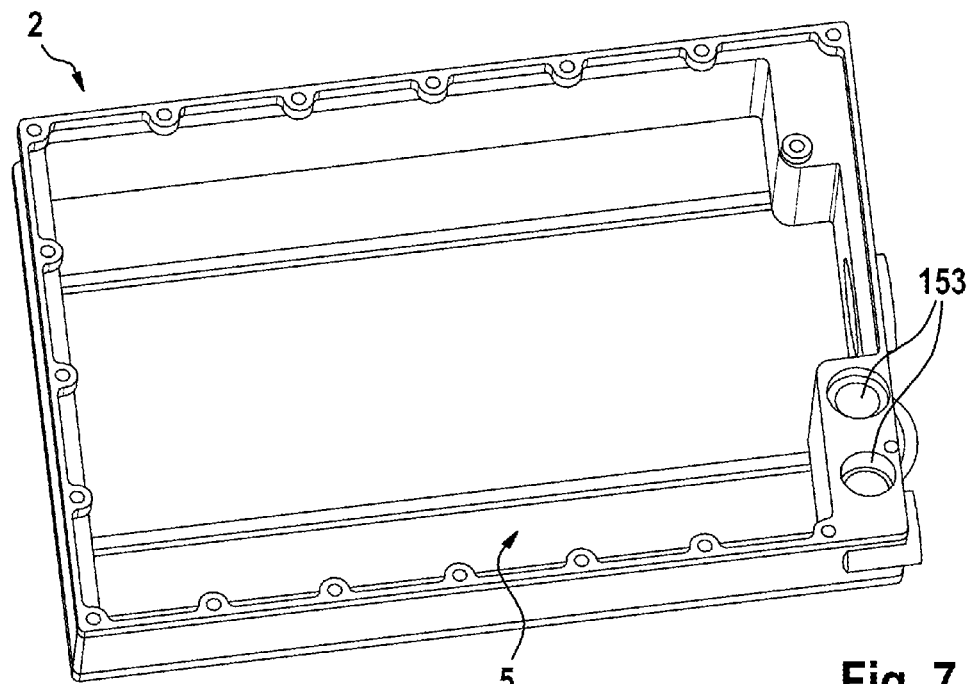
FIG. 7 illustrates a perspective view of an upper face of a first housing element and FIG. 8 illustrates a perspective view of a lower face of a first housing element.

FIG. 7 illustrates a perspective view of an upper face of a first housing element 2. In this case, in particular the inner chamber 5 is apparent, said inner chamber receiving the plurality of battery cells 6 that are not apparent in the FIG. 7. Furthermore, this figure illustrates the temperature-controlling fluid guides 153 that are embodied within the first housing element 2. The temperature-controlling fluid guides 153 are embodied so as to connect a temperature-controlling fluid inlet of the housing element to the temperature-controlling fluid outlet of the other housing element in a fluid-tight manner with the result that it is possible to realize a parallel or in series throughflow.

Figure 8:
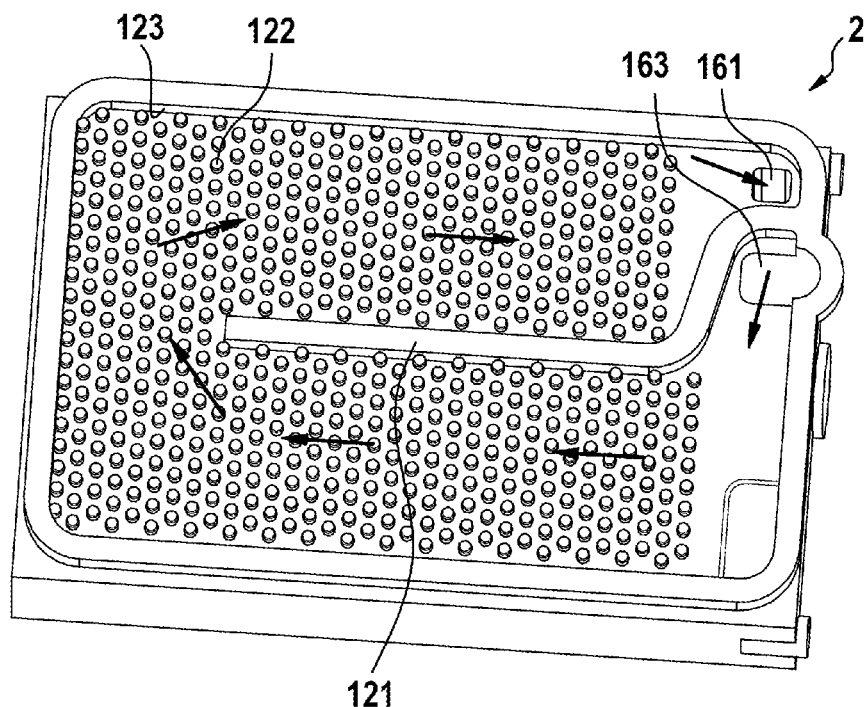

FIG. 8 illustrates a perspective view of a lower face of the first housing element 2 in accordance with FIG. 7. In this case, in particular the first temperature control structure 101 is apparent, said temperature control structure being arranged on a face of the first housing element that is remote from the inner chamber 5. In addition, this figure illustrates the temperature-controlling fluid inlet 163 of the further temperature-controlling fluid receiving device 111 and the temperature-controlling fluid outlet 164 of the further temperature-controlling fluid receiving deice 111. The first temperature control structure 101 is embodied in this case as flow-conducting elements 121, as flow-disturbing elements 122 or as flow-delimiting elements 123. It is to be noted at this point that a further cover element 14 that is not apparent in FIG. 8 is connected to the first housing element 2 in such a manner that the further cover element 14 delimits the further temperature-controlling fluid receiving device in a fluid-tight manner with respect to an environment.

The invention claimed is:

1. A battery comprising
a first housing element (2) and a second housing element (3) that jointly form an inner chamber (5) for receiving a battery module (10),
wherein a plurality of battery cells (6) of the battery module (10) that are interconnected to one another in series and/or parallel in an electrically conductive manner are arranged in the inner chamber (5),
wherein a first element (8) of a battery control system is arranged in the inner chamber (5), wherein the first housing element (2) forms a first temperature control structure (101) on a face that is opposite from the inner chamber (5), the first temperature control structure (101) including a plurality of first projections extending from the face that is opposite from the inner chamber (5),
wherein the second housing element (3) forms a second temperature control structure (102) on a face that is facing the inner chamber (5), the second temperature control structure (102) including a plurality of second projections extending from the face that is facing the inner chamber (5), and
wherein a cover element (100) is connected to the second housing element (3) in such a manner that a temperature-controlling fluid receiving device (112) through which temperature-controlling fluid can flow is delimited by the cover element (100) in a fluid-tight manner with respect to the inner chamber (5), and the second temperature control structure (102) is configured such a manner that the temperature-controlling fluid can flow around the plurality of second projections.

2. The battery according to the claim 1, characterized in that the first element (8) of the battery control system is arranged in a thermally conductive manner on a face of the cover element (100) that is facing the inner chamber (5).

3. The battery according to claim 1, characterized in that a second element (9) of the battery control system is arranged in a thermally conductive manner on a face of the second housing element (3) that is remote from the inner chamber (5).

4. The battery according to claim 1, characterized in that the first element (8) of the battery control system comprises at least one electrical component (80) and/or at least one electronic component (81) of the battery module (10).

5. The battery according to claim 4, characterized in that the electrical component (80) of the battery module (10) is a cell connector (82) and/or a conductor (83) and/or that the electronic component (81) of the battery module (10) is a switch, a safety element, a battery control system and/or a resistance.

6. The battery according to claim 4, characterized in that the at least one electronic component (81) is integrated into a printed circuit board (90).

7. The battery according to claim 3, characterized in that the second element (9) of the battery control system is an electrical voltage converter (91).

8. The battery according to claim 1, characterized in that the cover element (100) is embodied in a planar manner from a metal or that the cover element (100) comprises a molded shape (110) for receiving the first element (8) of the battery control system.

9. The battery according to claim 1, characterized in that the plurality of battery cells (6) is arranged in a thermally conductive manner with a first inner face of the inner chamber (5) arranged directly adjacent to the first temperature control structure (101).

10. The battery according to claim 1, characterized in that the first housing element (2) and/or the second housing element (3) are each embodied as a die-cast housing (20, 30).

11. The battery according to claim 1,
characterized in that
the first housing element (2) and the second housing element (3) are embodied in a fluid-tight manner connected to one another.

12. The battery according to claim 1,
characterized in that
a further cover element (14) is connected to the first housing element (2) in such a manner that a further temperature-controlling fluid receiving device (111) through which temperature-controlling fluid can flow is delimited by the further cover element (14) in a fluid-tight manner with respect to an environment, and
the first temperature control structure (101) is configured such that the temperature-controlling fluid can flow around the first projections.

13. The battery according to claim 1,
characterized in that
the battery comprises a first connection (151), which is embodied so as to convey temperature-controlling fluid to the battery, and a second connection (152) that is embodied so as to convey temperature-controlling fluid away from the battery (1), wherein
the battery comprises temperature-controlling fluid guides (153) that are configured such that temperature-controlling fluid can flow through the temperature-controlling fluid receiving device (112) and the further temperature-controlling fluid receiving device (111) in series or parallel.

14. The battery as claimed in claim 1, characterized in that the plurality of first projections of the first temperature control structure (101) and/or the plurality of second projections of the second temperature control structure (102) includes flow-conducting elements (121), flow-disturbing elements (122) or flow-delimiting elements (123).

15. A battery comprising
a first housing element (2) and a second housing element (3) that jointly form an inner chamber (5) for receiving a battery module (10),
wherein a plurality of battery cells (6) of the battery module (10) that are interconnected to one another in series and/or parallel in an electrically conductive manner are arranged in the inner chamber (5),
wherein the battery cells (6) are embodied in a prismatic manner and furthermore a first element (8) of a battery control system is arranged in the inner chamber (5),
wherein the first housing element (2) forms a first temperature control structure (101) on a face that is opposite from the inner chamber (5) and is remote from the second housing element (3), the first temperature control structure (101) including a plurality of first projections extending from the face that is opposite from the inner chamber (5),
wherein the second housing element (3) forms a second temperature control structure (102) on a face that is facing the inner chamber (5) and is facing the first housing element (2), the second temperature control structure (102) including a plurality of second projections extending from the face that is facing the inner chamber (5), and
wherein a cover element (100) is connected to the second housing element (3) in such a manner that a temperature-controlling fluid receiving device (112) through which temperature-controlling fluid can flow is delimited by the cover element (100) in a fluid-tight manner with respect to the inner chamber (5), and the second temperature control structure (102) is configured such a manner that the temperature-controlling fluid can flow around the plurality of second projections.

16. The battery according to claim 15, characterized in that a second element (9) of the battery control system is arranged in a thermally conductive manner on a face of the second housing element (3) that is remote from the inner chamber (5) and is remote from the first housing element (2).

17. The battery according to claim 16, characterized in that the second element (9) of the battery control system is a DC converter (92).

18. The battery according to claim 15,
characterized in that
the first housing element (2) and the second housing element (3) are embodied in a fluid-tight manner connected to one another, wherein
a sealing element (131) is arranged between the first housing element (2) and the second housing element (3).

19. A method of using a battery (1) as claimed in claim 1 for controlling the temperature and for reducing the temperature of the plurality of battery cells (6), of the electrical component (8), wherein a temperature-controlling fluid that is in the form of a temperature-controlling liquid or a temperature-controlling gas flows around the plurality of first projections and wherein the temperature-controlling fluid that is in the form of a temperature-controlling liquid flows through the temperature-controlling fluid receiving device (112).

20. The battery of claim 1, wherein the plurality of first projections includes a plurality of first flow-disturbing elements configured to increase turbulence of a flow and a first flow-conducting element configured to guide the flow in a U-shaped path, and wherein the plurality of second projections includes a plurality of second flow-disturbing elements configured to increase turbulence of a temperature-controlling fluid and a second flow-conducting element configured to guide the temperature-controlling fluid in a U-shaped path.

* * * * *